US008868910B2

(12) United States Patent
Chen et al.

(10) Patent No.: US 8,868,910 B2
(45) Date of Patent: Oct. 21, 2014

(54) ELLIPTIC CURVE CRYPTOGRAPHIC SIGNATURE

(75) Inventors: Liqun Chen, Bristol (GB); Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 164 days.

(21) Appl. No.: 13/370,190

(22) Filed: Feb. 9, 2012

(65) Prior Publication Data

US 2013/0212391 A1    Aug. 15, 2013

(51) Int. Cl.
*H04L 9/08*    (2006.01)

(52) U.S. Cl.
USPC ............................................ 713/170; 713/168

(58) Field of Classification Search
USPC .................................................. 713/170, 168
See application file for complete search history.

(56) References Cited

U.S. PATENT DOCUMENTS

| 7,222,062 | B2 | 5/2007 | Goud et al. | |
|---|---|---|---|---|
| 7,844,614 | B2 | 11/2010 | Brickell et al. | |
| 7,860,247 | B2 * | 12/2010 | McCullagh et al. | 380/44 |
| 7,913,086 | B2 | 3/2011 | Kostiainen et al. | |
| 2003/0138105 | A1 * | 7/2003 | Challener et al. | 380/277 |
| 2003/0233559 | A1 * | 12/2003 | Asano et al. | 713/189 |
| 2005/0135606 | A1 * | 6/2005 | Brown | 380/28 |
| 2006/0153365 | A1 * | 7/2006 | Beeson | 380/30 |
| 2008/0201262 | A1 | 8/2008 | Saito et al. | |
| 2008/0307223 | A1 | 12/2008 | Brickell et al. | |
| 2009/0129600 | A1 | 5/2009 | Brickell et al. | |
| 2009/0210705 | A1 * | 8/2009 | Chen | 713/158 |
| 2009/0210716 | A1 * | 8/2009 | Chen | 713/176 |
| 2009/0271618 | A1 | 10/2009 | Camenisch et al. | |
| 2009/0307493 | A1 | 12/2009 | Smith | |
| 2010/0082973 | A1 * | 4/2010 | Brickell et al. | 713/155 |
| 2011/0145425 | A1 | 6/2011 | Xiao et al. | |
| 2011/0302412 | A1 * | 12/2011 | Deng et al. | 713/159 |
| 2012/0278628 | A1 * | 11/2012 | Chen | 713/176 |
| 2012/0278631 | A1 * | 11/2012 | Balinsky et al. | 713/189 |

FOREIGN PATENT DOCUMENTS

| JP | 2004312512 A | 11/2004 |
|---|---|---|
| JP | 2010164927 A | 7/2010 |
| KR | 2005-0042358 A | 5/2005 |
| KR | 2007-0007021 A | 1/2007 |
| WO | WO-2010137508 A1 | 12/2010 |
| WO | WO-2012115671 A1 | 8/2012 |

OTHER PUBLICATIONS

Brickell et al., "Direct Anonymous Attestation," CCS '04, Oct. 25-29, 2004, 14 p.
Brickell et al., "Simplified Security Notions of Direct Anonymous Attestation and a Concrete Scheme from Pairings," Int'l. Journal of Information Security, 8(5):315-330, 2009.

(Continued)

*Primary Examiner* — Christopher Revak
*Assistant Examiner* — Jason C Chiang

(57) ABSTRACT

A method includes generating a randomized base point and causing the randomized base point and a private key to be loaded into a signature engine device. The method also includes signing a message using the randomized base point and the private key as a base point as well as the private key in an elliptic curve cryptographic (ECC) signature.

15 Claims, 7 Drawing Sheets

(56) References Cited

OTHER PUBLICATIONS

Chen et al., "On the Design and Implementation of an Efficient DAA Scheme," In the Proceedings of the Ninth Smart Card Research and Advanced Application IFIP Conference (CARDIS 2010); LNCS vol. 6035, pp. 223-237, Springer, 2010.

International Standard, "Part 1: General," Information technology—Security techniques—Cryptographic techniques based on elliptic curves, Nov. 23, 2007, 40 p.

International Standard, "Part 5: Elliptic Curve Generation," Information technology—Security techniques—Cryptographic techniques based on elliptic curves, ISO/IEC 2009, 38 p.

Trusted Computing Group, "TPM Main Part 1 Design Principles," Specification Version 1.2, Revision 116, Mar. 1, 2011, TCG Published, 184 p.

Trusted Computing Group, "TPM Main Part 2 TPM Structures," Specification Version 1.2, Level 2 Revision 116, Mar. 1, 2011, TCG Published, 202 p.

Trusted Computing Group, "TPM Main Part 3 Commands," Specification Version 1.2, Level 2 Revision 116, Mar. 1, 2011, TCG Published, 339 p.

Trusted Computing Group, "TPM Main Specification," Copyright 2012 Trusted Computing Group, 2 p.

HPDC, International Search Report and Written Opinion mailed Jan. 13, 2012, PCT App. No. PCT/US2011/034804. filed May 2, 2011, 8 p.

Leicher et al., "Implementation of a Trusted Ticket System," Emerging Challenges for Security, Privacy and Trust, IFIP Advances in Information and Communication Technology, vol. 297, pp. 152-163, May 14, 2009, Conf. 24th IFIP Intl Info Security Conf., Paphos, Cyprus, May 18-20, 2009.

Smyth et al., "Direct Anonymous Attestation (DAA): Ensuring Privacy with Corrupt Administrators," ESAS 2007, LNCS 4572, vol. 4572, pp. 218-231, Jun. 22, 2007, 4th European Workshop Security & Privacy in Ad Hoc & Sensor Networks, Cambridge, England, Jul. 2-3, 2007.

\* cited by examiner

ELLIPTIC CURVE CRYPTOGRAPHIC SIGNATURE

BACKGROUND

In many situations, a computing platform is verified by another computing system as being "trusted" meaning, for example, that the latter computing system is assured of a particular configuration for the computing system being verified (e.g., that certain software loaded on the computing platform). For example, the computing system wishing to verify a computing platform may not want to provide access to the computing platform unless the platform has a particular operating system, certain anti-virus software, etc.

Direct Anonymous Attestation (DAA) is a scheme in which an issuing entity is in charge of verifying the legitimacy of a particular platform which, in turn, verifies itself to a remote system. The issuing entity issues a DAA credential to the platform once the platform has verified itself to the issuing entity. The platform then may prove to the remote system that the platform holds a valid DAA credential by providing a DAA signature to the remote system. Using DAA, the privacy of the platform being verified is preserved during the process that the platform proves its legitimacy to the remote system.

BRIEF DESCRIPTION OF THE DRAWINGS

For a detailed description of various examples, reference will now be made to the accompanying drawings in which.

DETAILED DESCRIPTION

As used herein, the term "system" refers to a combination of two or more components. A system may refer, for example, to a combination of computers in communication with each other via a network, a single computer (which comprises a collection of constituent elements) or a sub-system of a computer. Also, the phrase "based on" means "based at least on the following . . . ." Thus, if X is computed based on Y, then X is computed based at least on Y but can be computed based on additional values as well.

Figure 1:
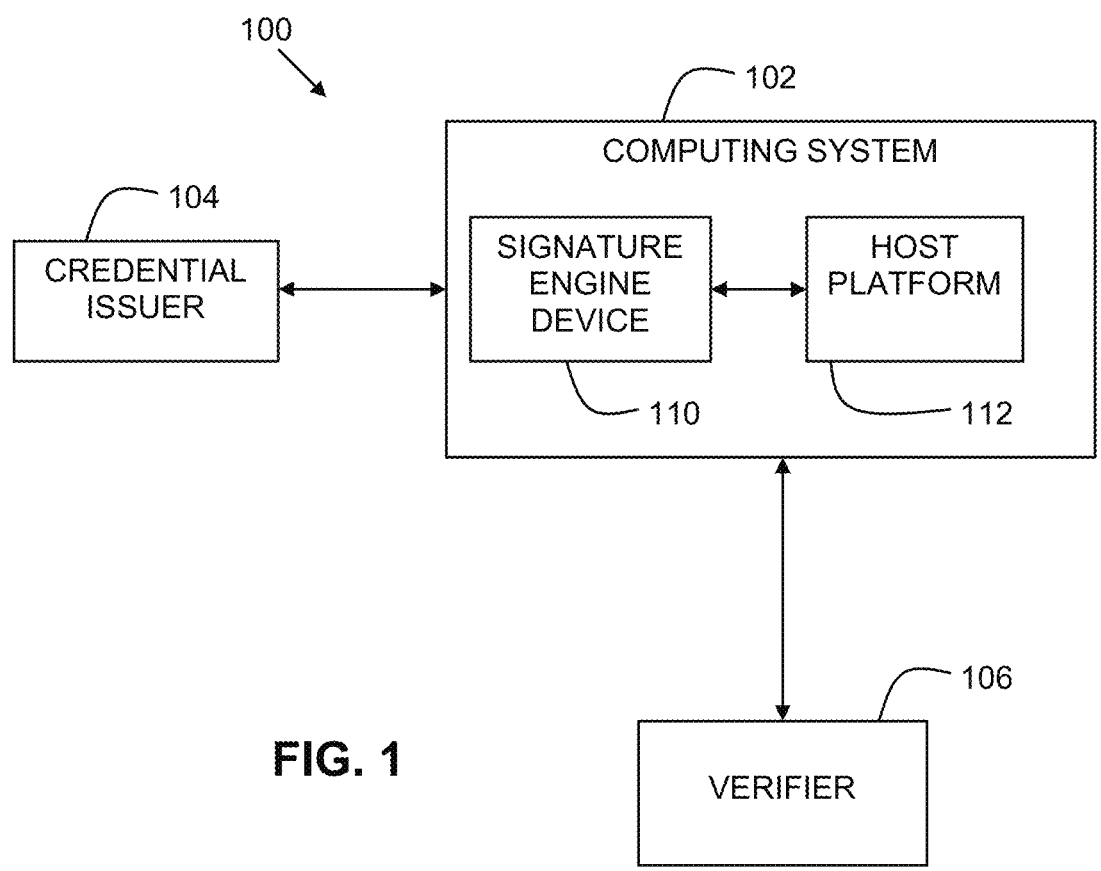
FIG. 1 shows a system in accordance with various examples.

Many DAA signature operations are generally costly and inflexible. There is a need for a more streamlined and flexible system to provide signing, certifying, and quoting operations. The implementations described herein address this issue. FIG. 1 shows a system 100 comprising a computing system 102 coupled to a credential issuer 104 and a verifier 106. The computing system 102 comprises a signature engine device 110 coupled to a host platform 112. The system 100 may include any number of computing systems 102, credential issuers 104, and verifiers 106.

The computing system 102 may be implemented as a computer. The signature engine device 110 may be an autonomous hardware device or module which, at the request of the host platform, outputs a digital signature for a message using a private key held exclusively by the signature engine, and thus not accessible to (i.e., cannot be read and viewed by) the host platform 112. The message may be generated by the signature engine or received from an external entity, such as the host platform 112. In some examples, the signature engine device 110 may be a Trusted Platform Module (TPM).

The host platform 112 comprises logic of the computing system 102 other than signature engine device 110. Such host platform logic may include a central processing unit (CPU), memory (e.g., random access memory), non-volatile storage (e.g., a hard disk drive), and other components of, for example, a computer. The communication between the host platform 112 and the signature engine device 110 may be via, for example, a low pin count (LPC) interface, or other suitable interface.

The credential issuer 104 may be a trusted electronic device that provides trusted digital credentials associated with signature engine devices, such as signature engine device 110, to computing system 102. The verifier 106 may include an electronic device that communicates with a host device and determines whether digital credentials associated with the computing system 102 are valid. Each of the credential issuer 104 and verifier 106 may be implemented as a computer and, as such, may comprise a CPU, memory, software, etc.

Referring still to FIG. 1, the computing system 102 communicates with the credential issuer 104 over a network. In some examples, the computing system 102 receives digital credentials from the credential issuer 104. The computing system 102 generates an anonymous digital signature for a message to the verifier 106 that can be verified using the credentials received from the credential issuer 104. If the credential issuer 104 is trusted by the verifier 106 (which is assumed to be the case in this disclosure), verifier 106 may infer trust in the computing system 102 based on the verified credentials provided by the host platform 112.

Figure 2:
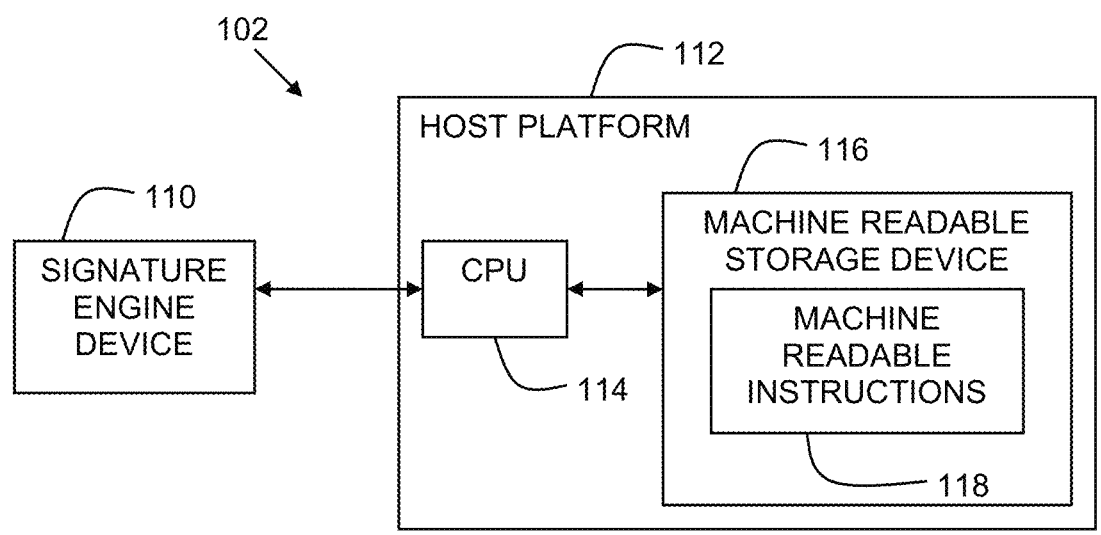
FIG. 2 shows a block diagram of a computing system in accordance with various examples.

FIG. 2 illustrates an example block diagram of computing system 102. The signature engine device 110 is shown coupled to the host platform 112. The host platform 112 includes a central processing unit (CPU) 114 coupled to a machine-readable storage device 116. The machine-readable storage device 116 includes machine-readable instructions 118 that, when executed by the host platform's CPU 114, impart some or all of the functionality described herein as being attributed to the host platform 114.

The computing system 102 implements a privacy-preserving signature implementation which is based on elliptic curve cryptography (ECC). The signature implementation described herein ensures the pseudonymity or anonymity of the computing system 102 when the verifier is verifying the configuration of the computing system 102. Pseudonymity means that different signatures from the same signer can be correlated but the true identity of the signer is still unknown. Anonymity means that different signatures from the same signer cannot be correlated. The privacy-preserving signature implementation described herein may use any existing or future created TPM signing method such as TPM2_Sign( ) for ordinary signatures, TPM2_Certify( ) for certification of other keys, or TPM2_Quote( ) for quotes. Any such signing method can be anonymized or pseudonymized. The signature engine device 110 may sign a message with any ordinary elliptic curve (EC) signature scheme, such as the Digital Signature Algorithm (DSA), ISO 14888-3 (such as Schnoor, Russian, or Korean), etc.

Figure 3:
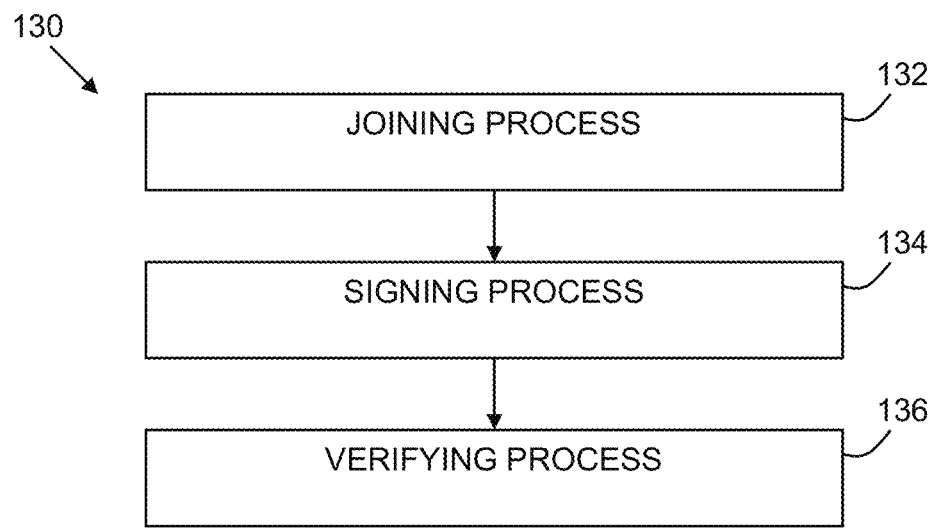
FIG. 3 shows a method including joining, signing, and verifying processes in accordance with various examples.

FIG. 3 shows an example of a method 130 in accordance with various embodiments. At 132, the computing system 102 and the credential issuer 104 perform a joining process in which the computing system 102 obtains credentials from the trusted credential issuer 104. At 134, a signing process is performed by the computing system 102 in which a message is signed anonymously or pseudonymously by the coordinated actions of the signature engine device 110 and host platform 112. The verifier 106 verifies the signature in a verification process 136. The signing and verifying actions can be anonymous signing/verifying or pseudonymous signing/verifying.

Figure 4:
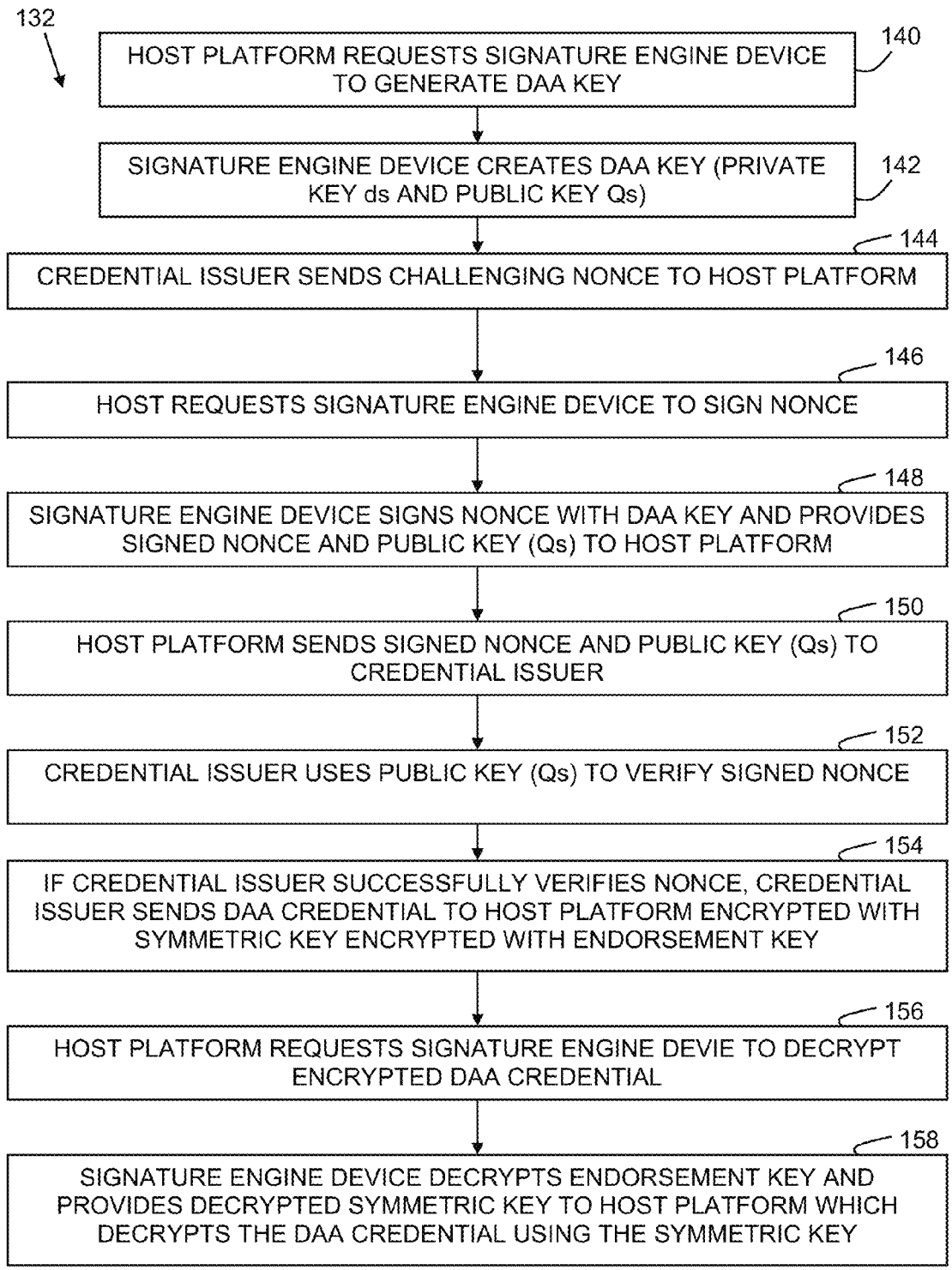
FIG. 4 shows an example of a joining process.

FIG. 4 provides an example of a joining process (132 above). The actions depicted in FIG. 4 can be performed in the order shown or in a different order. Further, two or more of the actions may be performed in parallel rather then serially.

At 140, the host platform 112 requests the signature engine device 110 to generate a DAA key. At 142, the signature engine device 110 creates a DAA key which includes a private key (ds) and a public key (Qs). The public key is computed by scalar multiplying ds with P written as Qs=ds×P, where P is a base point, for example, already stored inside of the signature engine device 110. At 144, the credential issuer 104 sends a challenging nonce to the host platform 112, and at 146, the host platform 112 requests the signature engine device 110 to sign the challenging nonce. At 148, the signature engine device 110 then signs the challenging nonce with the DAA key and provides the signed nonce and public key (Qs) to the host platform 112.

The host platform 112 sends the signed nonce and public key (Qs) to the credential issuer 104 (150) which uses the public key to verify the signed nonce (152). At 154, if the credential issuer 104 was able to successfully verify the signed nonce, the credential issuer sends a DAA credential, which is represented as four elliptic curve points (A, B, C, D) and is encrypted with a symmetric key that is encrypted with an endorsement key, to the host platform 112. At 156, the host platform 112 requests the signature engine device 110 to decrypt the encrypted DAA credential. At 158, the signature engine device 110 decrypts endorsement key and provides the decrypted symmetric key to the host platform, which decrypts the DAA credential using the symmetric key.

Any time either before or during the signing process 134, the host platform 112 may randomize the DAA credential (A, B, C, D). Each point is randomized by scalar multiplying it by a random number r generated by the host platform 112. The randomized credential becomes (Qa, Qb, Qc, Qd)=(r×A, r×B, r×C, r×D). This randomizing credential process is used either for a pseudonymous signing process or for an anonymous signing process.

Figure 5:
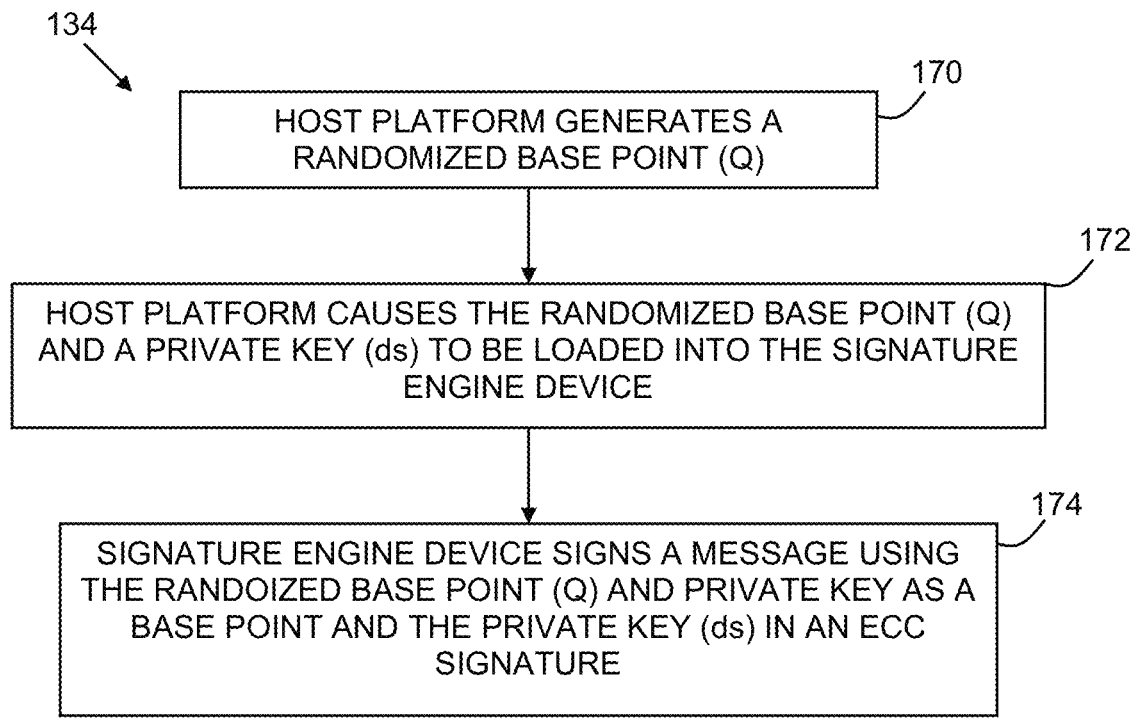
FIG. 5 shows an illustrative example of a signing process.
Figure 6:
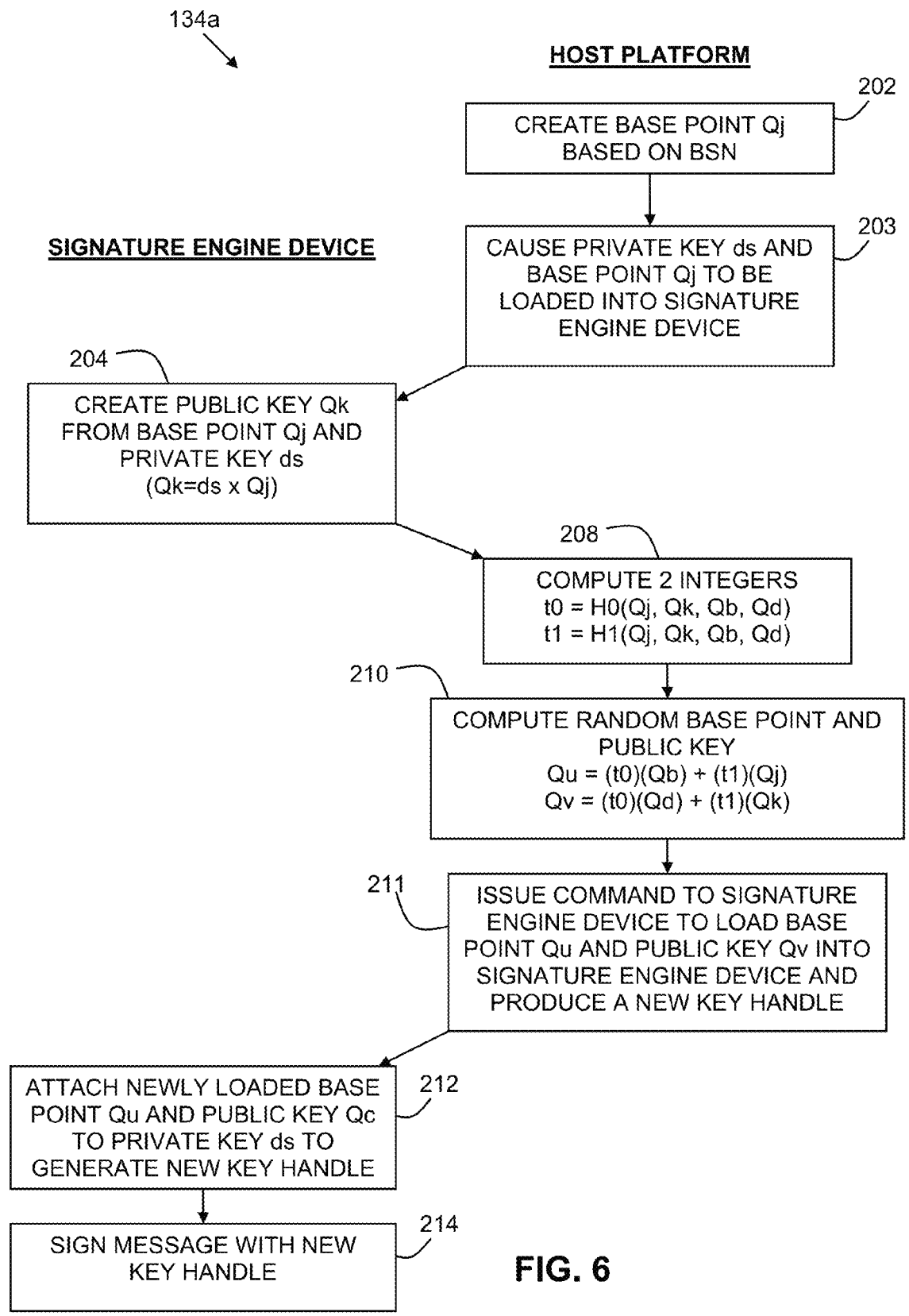
FIG. 6 shows an example of a pseudonymous signing process.
Figure 7:
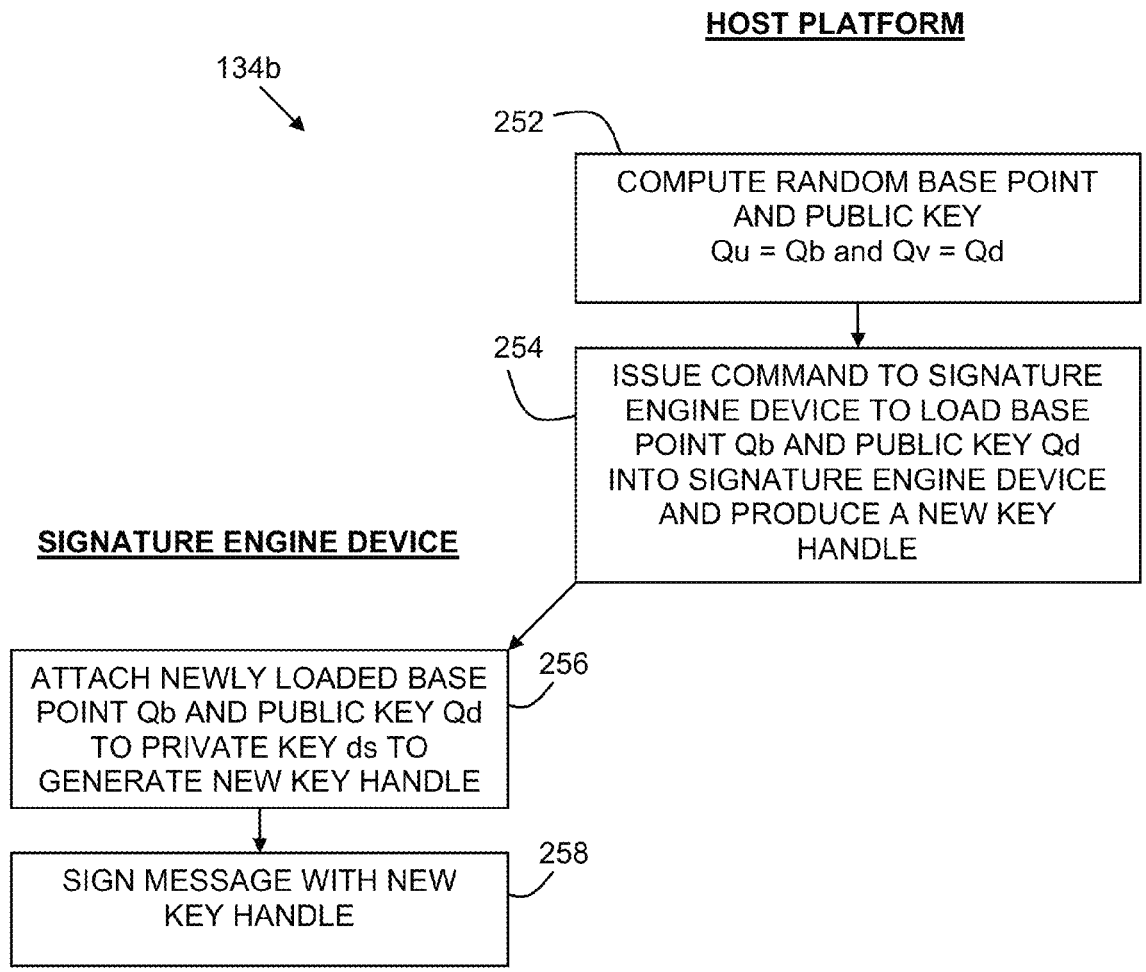
FIG. 7 shows an example of an anonymous signing process.

FIG. 5 shows an example of signing process 134a. At 170, the signing process 134 includes the host platform generating a randomized base point (Q). At 172, the signing process includes the host platform causing the randomized base point (Q) and the private key (ds) to be loaded into the signature engine device 110. At 174, the signature engine device 110 signs a message using the randomized base point (Q) and the private key as a base point and the private key (ds) in an elliptic curve cryptographic signature. The signing process depicted in FIG. 5 can be pseudonymous or anonymous as noted above. FIG. 6 provides an example of a pseudonymous signing process and FIG. 7 provides an example of an anonymous signing process.

Referring now to the pseudonymous signing process of FIG. 6, the actions depicted in FIG. 6 can be performed in the order shown or, where possible, in a different order. Further, two or more of the actions may be performed in parallel rather than in series. Some of the actions are performed by the host platform 112 while other actions are performed by the signature engine device 110 as requested by the host platform 112.

At 202, the host platform 112 creates an extra base point (Qj) which is based on a special data string, called a basename or written as BSN. The value BSN is an arbitrary data string which may be generated by the host platform 112, or by other logic. The host platform 112 generates the base point (Qj) from a hash function H( ) with input BSN, Qj=H(BSN).

At 204, the signature engine device 110 creates a public key Qk from the base point Qj and the DAA private key ds (e.g., Qk results from the scalar multiplication of ds and Qj). In some examples, the TPM2_Load( )command or TPM2_LoadPrimary( ) command may be used to load the previously generated private key ds into the signature engine device 110. The action of generating the public key Qk may be performed by the host platform 112 invoking the TPM2_ECDH_ZGen( )command. This command causes the signature engine device 110 to compute Qk as the scalar multiplication of the base point Qj and the signature engine device's private key (ds), that is, Qk=ds×Qj. The signature engine device 110 returns Qk to the host platform 112.

At 208, the host platform 112 computes two integers t0 and t1 using two hash functions H0( )and H1( ) The two integers t0 and t1 are computed as:

$$t0 = H0(Qj, Qk, Qb, Qd)$$

$$t1 = H1(Qj, Qk, Qb, Qd)$$

The two hash functions H0( )and H1( )may be different hash functions in some implementations. In other implementations, the same hash function is used for H0( )and H1( ) but each function has an extra, yet different, integer input. For example, integer t0 may be computed as H(0,m) where m is the input including Qj,Qk,Qb,Qd, and integer t1 may be computed as H(1,m). In such implementations, t0 and t1 are computed using the same hash function and largely the same input values, but t0 also has the integer 0 as an input value, whereas t1 has integer 1 as an input value instead.

At 210, the host platform 112 randomizes another base point and a public key from the two base points Qj and Qb and two public keys Qk and Qd. The randomized base point is Qu and the randomized public key is Qv, and such values are computed as follows:

$$Qu = (t0)(Qb) + (t1)(Qj)$$

$$Qv = (t0)(Qd) + (t1)(Qk)$$

At 211, the host platform 112 issues a command to the signature engine device 110 to cause the signature engine device to load the base point (Qu) and public key (Qv) into the signature engine device and produce a new key handle. In response, at 212 the signature engine device 112 loads Qu and Qv and attaches the loaded base point and public to the previously loaded private key (ds) to generate the new key handle. The command issued by the host platform 112 may be called the TMP2_LoadPublicArea( )command. This command thus is used to load the public area of an object (e.g., a key) into the signature engine device 110 and attach it to the sensitive area of a loaded key. This command assumes that the sensitive area of a compatible key has already been loaded into the signature engine device 110 and can be accessed by way of the key handle.

Finally, at 214, the signature engine device 110 signs the message with key handle produced at 212. As noted above, any ECC-based signing method can be used. For example, the "BN" curve is used as the elliptic curve. The use of the BN curve may result in a more efficient signing method than other types of elliptic curves.

FIG. 7 shows an example of a signing process 134b in accordance with various examples. The signing process 134b of FIG. 6 is an anonymous signing process. The actions depicted in FIG. 6 can be performed in the order shown or, where possible, in a different order. Further, two or more of the actions may be performed in parallel rather than in series. Some of the actions are performed by the host platform 112 while other actions are performed by the signature engine device 110 as requested by the host platform.

Compared with the pseudonymous signing process, the anonymous signing process does not involve a basename BSN and its related base point Qj and public key Qk, and it does not involve the hash functions H0( )and H1( ) either. Therefore, Qu=Qb and Qv=Qd. Everything else is the same for the anonymous signing process as the illustrative pseudonymous signing process described above. FIG. 7 illustrates an example of an anonymous signing process 134b. At 252, the host platform computes a randomized base point Qb and public key Qd as shown. At 254, the host platform issues a command to the signature engine device 110 to load the base point Qb and public key Qd into the signature engine device and produce a new key handle. At 256, the signature engine device attaches the newly loaded base point Qb and public key Qd to the private key ds to generate the new key handle, and at 258 the signature engine device 110 signs the message with key handle produced at 256.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
generating a randomized base point by adding together a plurality of parts, each part based on a hash function, wherein the plurality of parts includes a first part and a second part, the first part computed as a scalar multiplication of a first randomized base point and a first integer, said first integer being a result of a hash function, and the second part based on a scalar multiplication of a second randomized base point and a second integer, said second integer being a result of a hash function;
causing the randomized base point and a private key to be loaded into a signature engine device; and
signing a message using the randomized base point and the private key as a base point as well as the private key in an elliptic curve cryptographic (ECC) signature.

2. The method of claim 1 wherein generating the randomized base point comprises performing an ECC scalar multiplication of a fixed base point with a random number.

3. The method of claim 2 further comprising verifying the ECC signature using a randomized public key corresponding to the randomized base point and computed from a public key corresponding to the fixed base point.

4. The method of claim 3 further comprising computing the randomized public key as an ECC scalar multiplication of a fixed public key with a random number.

5. The method of claim 1 wherein generating the randomized base point includes performing a scalar multiplication of a randomized base point and an integer, said integer being a result of a hash function.

6. The method of claim 5 wherein inputs to the hash function include the randomized base point and a public key derived from the randomized base point and the private key.

7. The method of claim 1 further comprising verifying the ECC signature using a randomized public key based on a result of a hash function.

8. The method of claim 1 further comprising verifying the ECC signature, and wherein verifying the ECC signature comprises adding together two parts, a first being a scalar multiplication of a first randomized base point and a first integer, and a second part being a scalar multiplication of a randomized public key and a second integer, the first and second integer computed based on hash functions.

9. A system, comprising:
a host platform to generate a randomized base point; and
a signature engine device coupled to said host platform;
wherein the host platform is to cause the randomized base point and a private key to be loaded into the signature engine device, said private key inaccessible to the host platform; and
wherein said signature engine device is to sign a message using the randomized base point and the private key as a base point and private key, respectively, in an elliptic curve cryptographic (ECC) signature;
wherein the host platform is to generate the randomized base point as an addition of two parts, a first part based on a scalar multiplication of a first randomized base point and a first integer, said first integer being a result of a hash function, and the second part based on a scalar multiplication of a randomized public key and a second integer, said second integer being a result of hash function.

10. The system of claim 9 wherein the host platform generates the randomized base point via ECC scalar multiplication of a fixed base point with a random number.

11. The system of claim 9 wherein the host platform generates the randomized base point based on the scalar multiplication of a randomized public key and an integer, said integer being a result of a hash function.

12. The system of claim 11 wherein inputs to the hash function include the randomized base point and a public key derived from the randomized base point and the private key.

13. A non-transitory computer-readable storage device containing software that, when executed by a processor, causes the processor to:
generate a randomized base point;
cause the randomized base point and a private key to be loaded into a signature engine device;
sign a message using the randomized base point and the private key as a base point as well as the private key in an elliptic curve cryptographic (ECC) signature; and
verify the ECC signature by adding together two parts, a first being a scalar multiplication of a first randomized base point and a first integer, and a second part being a scalar multiplication of a randomized public key and a second integer, the first and second integer computed based on hash functions.

14. The non-transitory computer-readable storage device of claim 13 wherein the software causes the processor to generate the randomized base point by adding together a plurality of parts, each part based on a hash function.

15. The non-transitory computer-readable storage device of claim 14 wherein the plurality of parts includes a first part and a second part, and wherein the software causes the processor to compute the first part as a scalar multiplication of a first randomized base point and a first integer, said first integer being a result of a hash function, and to compute the second part as a scalar multiplication of a second randomized base point and a second integer, said second integer being a result of a hash function.

* * * * *